US011067000B2

(12) United States Patent
Smith

(10) Patent No.: US 11,067,000 B2
(45) Date of Patent: Jul. 20, 2021

(54) HYDRAULICALLY DRIVEN LOCAL PUMP

(71) Applicant: General Electric Company, Schenectady, NY (US)

(72) Inventor: Justin Paul Smith, Montgomery, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/274,543

(22) Filed: Feb. 13, 2019

(65) Prior Publication Data

US 2020/0256252 A1 Aug. 13, 2020

(51) Int. Cl.
| F02C 7/224 | (2006.01) |
| F02C 7/14 | (2006.01) |
| F02C 7/18 | (2006.01) |
| F02C 7/22 | (2006.01) |
| F02C 7/32 | (2006.01) |
| F02C 9/26 | (2006.01) |

(52) U.S. Cl.
CPC ............. *F02C 7/224* (2013.01); *F02C 7/14* (2013.01); *F02C 7/185* (2013.01); *F02C 7/22* (2013.01); *F02C 7/32* (2013.01); *F02C 9/26* (2013.01); *F05D 2260/213* (2013.01); *F05D 2260/98* (2013.01)

(58) Field of Classification Search
CPC .... F02C 7/14; F02C 7/22; F02C 7/224; F02C 7/236; F02C 9/26; F02C 9/28; F02C 9/48; F02C 9/50; F01D 9/065; F01D 25/20; F05D 2260/213

USPC ............... 60/786, 790, 39.15, 39.181, 39.25, 60/39.281, 801, 39.48, 734
See application file for complete search history.

(56) References Cited

U.S. PATENT DOCUMENTS

| 2,826,255 A | 3/1958 | Peterson |
| 3,651,645 A | 3/1972 | Grieb |
| 4,078,604 A | 3/1978 | Christl et al. |
| 4,312,184 A | 1/1982 | Mangus |
| 4,505,124 A | 3/1985 | Mayer |
| 4,550,573 A | 11/1985 | Rannenberg |

(Continued)

FOREIGN PATENT DOCUMENTS

| JP | S5932893 U | 2/1984 |
| WO | WO2006/068632 A1 | 6/2006 |
| WO | WO2014/105327 A1 | 7/2014 |

*Primary Examiner* — Mark A Laurenzi
*Assistant Examiner* — Mickey H France
(74) *Attorney, Agent, or Firm* — Dority & Manning, P.A.

(57) ABSTRACT

A gas turbine engine includes a compressor section, a combustion section, and a turbine section arranged in serial flow order; a casing surrounding the compressor section, the combustion section, and the turbine section; a first system comprising a first system fluid line, the first system fluid line including a first system fluid therein; and a second system including a hydraulic motor, the hydraulic motor positioned within the casing and fluidly coupled to the first system fluid line such that a flow of the first system fluid through the first system fluid line drives the hydraulic motor, the second system further including a fluid pump and a second system fluid line, the hydraulic motor drivingly coupled to the fluid pump, the fluid pump operable with the second system fluid line for providing a flow of a second system fluid through the second system fluid line during operation.

20 Claims, 4 Drawing Sheets

(56) References Cited

U.S. PATENT DOCUMENTS

| | | | |
|---|---|---|---|
| 4,992,027 A * | 2/1991 | Acosta | F02C 7/232 |
| | | | 251/63 |
| 5,003,772 A | 4/1991 | Huber | |
| 5,161,365 A * | 11/1992 | Wright | F02C 7/16 |
| | | | 60/39.461 |
| 5,297,386 A | 3/1994 | Kervistin | |
| 5,460,217 A | 10/1995 | Sakurai et al. | |
| 5,619,855 A | 4/1997 | Burrus | |
| 5,680,767 A | 10/1997 | Lee et al. | |
| 5,724,816 A | 3/1998 | Ritter et al. | |
| 5,782,076 A | 7/1998 | Huber et al. | |
| 5,802,841 A | 9/1998 | Maeda | |
| 5,819,525 A | 10/1998 | Gaul et al. | |
| 6,182,435 B1 | 2/2001 | Niggemann et al. | |
| 6,250,097 B1 | 6/2001 | Lui et al. | |
| 6,415,595 B1 | 7/2002 | Wilmot, Jr. et al. | |
| 6,578,362 B1 | 6/2003 | Coffinberry | |
| 6,584,778 B1 | 7/2003 | Griffiths et al. | |
| 7,104,072 B2 | 9/2006 | Thompson | |
| 7,260,926 B2 | 8/2007 | Sabatino et al. | |
| 7,882,704 B2 | 2/2011 | Chen | |
| 8,499,822 B2 | 8/2013 | Bulin et al. | |
| 8,522,572 B2 | 9/2013 | Coffinberry et al. | |
| 8,943,827 B2 | 2/2015 | Prociw et al. | |
| 8,944,367 B2 | 2/2015 | Bystry, Jr. et al. | |
| 8,955,330 B2 | 2/2015 | Narcus et al. | |
| 8,984,884 B2 | 3/2015 | Xu et al. | |
| 9,038,397 B2 | 5/2015 | Papa et al. | |
| 9,829,088 B2 | 11/2017 | Goujet | |
| 9,995,314 B2 | 6/2018 | Miller et al. | |
| 2009/0188234 A1 | 7/2009 | Suciu et al. | |
| 2010/0003148 A1 * | 1/2010 | Deldalle | F01D 15/08 |
| | | | 417/409 |
| 2010/0212857 A1 * | 8/2010 | Bulin | F02C 7/14 |
| | | | 165/41 |
| 2013/0145768 A1 * | 6/2013 | Vaughan | F02K 1/68 |
| | | | 60/771 |
| 2013/0186100 A1 | 7/2013 | Rhoden et al. | |
| 2014/0360153 A1 | 12/2014 | Papa et al. | |
| 2015/0000291 A1 | 1/2015 | Smith et al. | |
| 2016/0003255 A1 | 1/2016 | Corneliussen et al. | |
| 2016/0160863 A1 * | 6/2016 | Roach | B32B 27/34 |
| | | | 415/119 |
| 2016/0333728 A1 * | 11/2016 | Suciu | F02C 7/18 |
| 2017/0022900 A1 | 1/2017 | Miller et al. | |
| 2017/0030266 A1 | 2/2017 | Cerny et al. | |
| 2017/0114721 A1 | 4/2017 | Miller et al. | |
| 2018/0143060 A1 * | 5/2018 | Venter | F01D 25/18 |

\* cited by examiner

```
┌─────────────────────────────────────────────────────────────┐
│ PROVIDING A FIRST SYSTEM FLUID FLOW THROUGH A FIRST SYSTEM  │
│ FLUID LINE OF A FIRST SYSTEM OF THE GAS TURBINE ENGINE      │
│                          202                                │
└─────────────────────────────────────────────────────────────┘
   │
   │   ┌──────────────────────────────────────────────────────┐
   ├──▶│ PRESSURIZING THE FIRST SYSTEM FLUID FLOW WITH A      │
   │   │ FIRST SYSTEM FLUID PUMP                              │
   │   │                   204                                │
   │   └──────────────────────────────────────────────────────┘
   │   ┌──────────────────────────────────────────────────────┐
   ├──▶│ DRIVING THE FIRST SYSTEM FLUID PUMP WITH AN ACCESSORY│
   │   │ GEARBOX OF THE GAS TURBINE ENGINE                    │
   │   │                   206                                │
   │   └──────────────────────────────────────────────────────┘
   ▼
┌─────────────────────────────────────────────────────────────┐
│ DRIVING A HYDRAULIC MOTOR OF A SECOND SYSTEM OF THE GAS     │
│ TURBINE ENGINE WITH THE FIRST SYSTEM FLUID FLOW THROUGH THE │
│ FIRST SYSTEM FLUID LINE                                     │
│                          208                                │
└─────────────────────────────────────────────────────────────┘
   │
   ▼
┌─────────────────────────────────────────────────────────────┐
│ PROVIDE A SECOND SYSTEM FLUID FLOW THROUGH A SECOND SYSTEM  │
│ FLUID LINE OF THE SECOND SYSTEM OF GAS TURBINE ENGINE WITH  │
│ THE HYDRAULIC MOTOR                                         │
│                          210                                │
└─────────────────────────────────────────────────────────────┘
   │
   │   ┌──────────────────────────────────────────────────────┐
   ├──▶│ DRIVING A SECOND SYSTEM FLUID PUMP WITH THE          │
   │   │ HYDRAULIC MOTOR                                      │
   │   │                   212                                │
   │   └──────────────────────────────────────────────────────┘
   │   ┌──────────────────────────────────────────────────────┐
   ├──▶│ PRESSURIZING THE SECOND SYSTEM FLUID FLOW WITH THE   │
   │   │ SEOND SYSTEM FLUID PUMP                              │
   │   │                   214                                │
   │   └──────────────────────────────────────────────────────┘
   ▼
┌─────────────────────────────────────────────────────────────┐
│ DETERMINING AN OPERATING CONDITION OF THE GAS TURBINE       │
│ ENGINE, AN AIRCRAFT INCLUDING THE GAS TURBINE ENGINE, OR    │
│ BOTH                                                        │
│                          216                                │
└─────────────────────────────────────────────────────────────┘
   │
   │   ┌──────────────────────────────────────────────────────┐
   ├──▶│ DETERMINING AN OPERATING CONDITION INDICATIVE OF A   │
   │   │ FUEL FLOW THE COMBUSTION SECTION GAS TURBINE ENGINE  │
   │   │                   222                                │
   │   └──────────────────────────────────────────────────────┘
   ▼
┌─────────────────────────────────────────────────────────────┐
│ REDUCING THE DRIVING OF THE HYDRAULIC MOTOR OF THE SECOND   │
│ SYSTEM OF THE GAS TURBINE ENGINE WITH THE FIRST SYSTEM      │
│ FLUID FLOW THROUGH THE FIRST SYSTEM FLUID LINE IN RESPONSE  │
│ TO DETERMINING THE OPERATING CONDITION OF THE GAS TURBINE   │
│ ENGINE, THE AIRCRAFT INCLUDING THE GAS TURBINE ENGINE, OR   │
│ BOTH                                                        │
│                          218                                │
└─────────────────────────────────────────────────────────────┘
   │
   │   ┌──────────────────────────────────────────────────────┐
   └──▶│ DIVERTING AT LEAST A PORTION OF THE FIRST SYSTEM     │
       │ FLUID FLOW THROUGH THE FIRST SYSTEM FLUID LINE       │
       │ AROUND THE HYDRAULIC MOTOR                           │
       │                   220                                │
       └──────────────────────────────────────────────────────┘
```

FIG. 4

HYDRAULICALLY DRIVEN LOCAL PUMP

FIELD

The present subject matter relates generally to a hydraulically driven, locally positioned pump for a system of a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, systems positioned throughout the gas turbine engine provide for proper operation of the gas turbine engine, and the maintenance of its components. Certain of such systems require a flow of fluid for operation. Such flows of fluid may be provided by one or more pumps driven by an accessory gearbox of the gas turbine engine positioned in the outer nacelle of the gas turbine engine. The pressurized fluid may then be ducted through one or more struts to the turbomachine to facilitate the operation of such systems.

However, ducting the pressurized fluid in such a manner may create difficulties related to loss of pressure, increased weight, cost, and complication, etc. Accordingly, an improved means for providing pressurized fluid to systems throughout the turbomachine would be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine defining a radial direction is provided. The gas turbine engine includes a compressor section, a combustion section, and a turbine section arranged in serial flow order; a casing surrounding the compressor section, the combustion section, and the turbine section; a first system comprising a first system fluid line, the first system fluid line including a first system fluid therein; and a second system including a hydraulic motor, the hydraulic motor positioned within the casing and fluidly coupled to the first system fluid line such that a flow of the first system fluid through the first system fluid line drives the hydraulic motor, the second system further including a fluid pump and a second system fluid line, the hydraulic motor drivingly coupled to the fluid pump, the fluid pump operable with the second system fluid line for providing a flow of a second system fluid through the second system fluid line during operation.

In certain exemplary embodiments the fluid pump is a second system fluid pump, wherein the first system further including a first system fluid pump fluidly coupled to the first system fluid line for providing the flow of first system fluid through the first system fluid line.

In certain exemplary embodiments the gas turbine engine further includes an accessory gearbox, wherein the first system fluid pump is driven by the accessory gearbox.

In certain exemplary embodiments the gas turbine engine further includes a fan; and an outer nacelle surrounding at least in part the fan, the casing, or both, and wherein the first system fluid pump and accessory gearbox are positioned within the outer nacelle.

In certain exemplary embodiments the first system is a fuel delivery system of the gas turbine engine.

In certain exemplary embodiments the first system is a lubrication oil system of the gas turbine engine.

In certain exemplary embodiments the second system is a thermal management system of the gas turbine engine.

For example, in certain exemplary embodiments the thermal management system includes a heat source heat exchanger and a heat sink heat exchanger, wherein the heat source heat exchanger is fluidly coupled to the heat sink heat exchanger through the second system fluid line.

For example, in certain exemplary embodiments the heat source heat exchanger is thermally coupled to the combustion section, the turbine section, or an exhaust section of the gas turbine engine, and wherein the heat sink heat exchanger is thermally coupled to the compressor section of the gas turbine engine, a fuel delivery system of the gas turbine engine, or a bypass airflow passage of the gas turbine engine.

In certain exemplary embodiments the first system, the second system, or both include one or more valves for bypassing operation of the hydraulic motor of the second system based on one or more operating conditions of the gas turbine engine.

In certain exemplary embodiments the gas turbine engine further includes a controller operably coupled to the one or more valves for controlling operation of the one or more values in response to an operating condition of the gas turbine engine, an aircraft including the gas turbine engine, or both.

In certain exemplary embodiments the gas turbine engine further includes one or more sensors operable with the gas turbine engine, the aircraft including the gas turbine engine, or both for sensing data indicative of the operating condition of the gas turbine engine, an aircraft including the gas turbine engine, or both, wherein the controller is operably coupled to the one or more sensors.

In an exemplary aspect of the present disclosure a method for operating a gas turbine engine includes providing a first system fluid flow through a first system fluid line of a first system of the gas turbine engine; driving a hydraulic motor of a second system of the gas turbine engine with the first system fluid flow through the first system fluid line, the hydraulic motor positioned within a casing surrounding a compressor section, a combustion section, and a turbine section of the gas turbine engine; and providing a second system fluid flow through a second system fluid line of the second system of the gas turbine engine with the hydraulic motor.

In certain exemplary aspects the second system fluid flow through the second system fluid line includes driving a second system fluid pump with the hydraulic motor, and pressurizing the second system fluid flow with the second system fluid pump.

In certain exemplary aspects the method further includes determining an operating condition of the gas turbine engine, an aircraft including the gas turbine engine, or both; and reducing the driving of the hydraulic motor of the second system of the gas turbine engine with the first system fluid flow through the first system fluid line in response to determining the operating condition of the gas turbine engine, the aircraft including the gas turbine engine, or both.

For example, in certain exemplary aspects reducing the driving of the hydraulic motor of the second system of the gas turbine engine includes diverting at least a portion of the first system fluid flow through the first system fluid line around the hydraulic motor.

For example, in certain exemplary aspects diverting at least a portion of the first system fluid flow through the first system fluid line around the hydraulic motor comprises actuating one or more valves fluidly coupled to the first system fluid line, the second system fluid line, or both.

For example, in certain exemplary aspects the first system is a fuel delivery system of the gas turbine engine, and wherein determining the operating condition of the gas turbine engine, the aircraft including the gas turbine engine, or both comprises determining an operating condition indicative of a fuel flow to a combustion section of the gas turbine engine.

In certain exemplary aspects providing a first system fluid flow through a first system fluid line of a first system of the gas turbine engine includes driving a first system fluid pump with an accessory gearbox.

For example, in certain exemplary aspects the accessory gearbox and first system fluid pump are positioned in an outer nacelle of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a flow diagram of a method for operating a gas turbine engine in accordance with the present disclosure.

DETAILED DESCRIPTION

Figure 1:
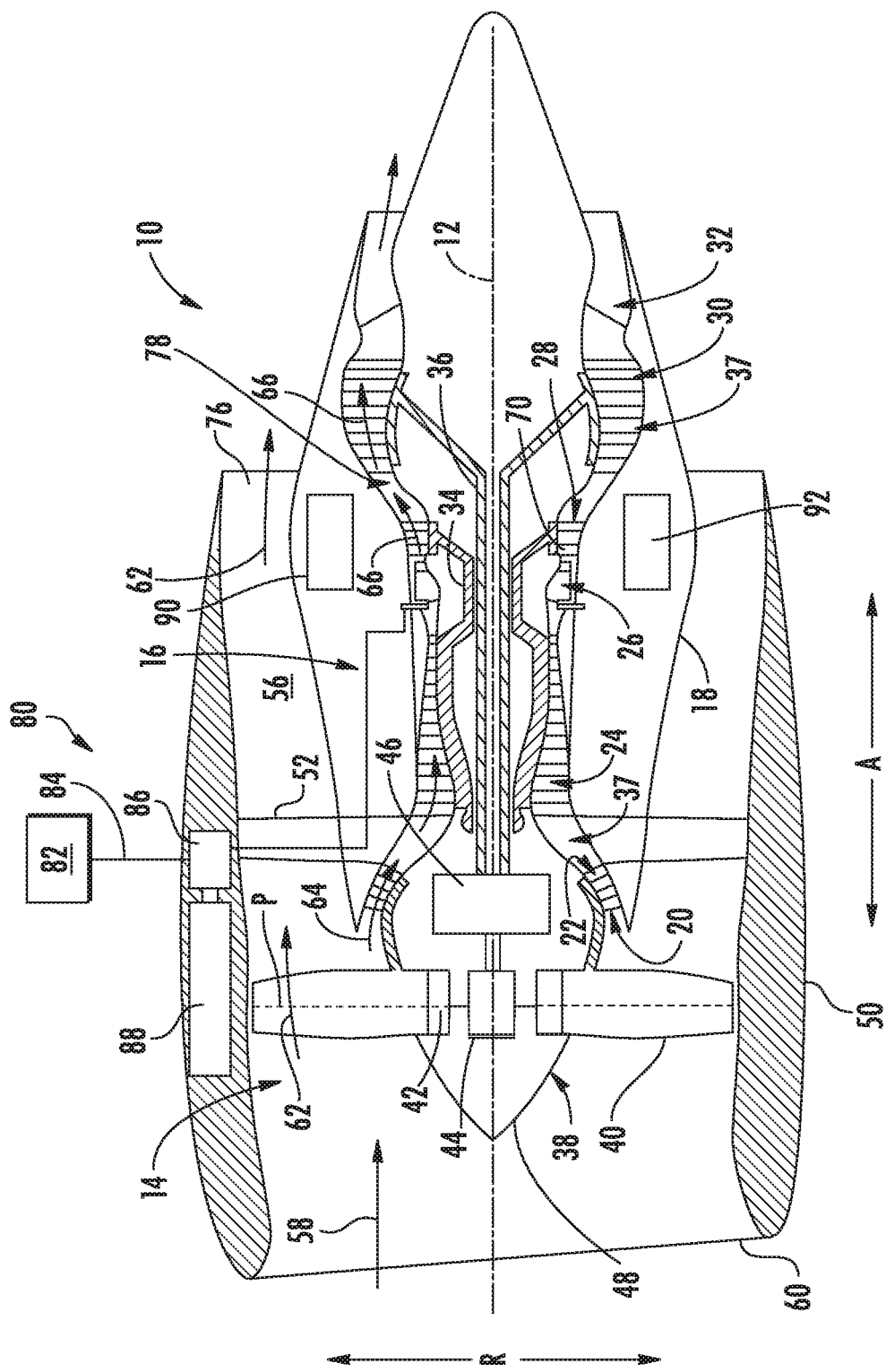
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Further, the exemplary turbofan engine 10 includes a fuel delivery system 80 providing a flow of fuel to the combustion section 26 of the turbofan engine 10. The fuel delivery system 80 generally includes a fuel source 82, a plurality of fuel lines 84, and a fuel pump 86. The fuel source 82 may be, e.g., a fuel tank positioned within a fuselage or one or more wings of an aircraft including the turbofan engine 10. Additionally, it will be appreciated that the exemplary turbofan engine 10 includes an accessory gearbox 88 (which may be driven by, e.g., the HP system of the turbofan engine 10 or the LP system of the turbofan engine 10, through one or more drive members extending through the strut 52). The accessory gearbox 88 is, for the embodiment shown, positioned within the nacelle 50 of the turbofan engine 10, and further the fuel pump 86 is coupled to, and driven by, the accessory gearbox 88. For example, the fuel pump 86 may be coupled to a pad of the accessory gearbox 88. Moreover, the one or more fuel lines 84 extend from the fuel source 82, to the fuel pump 86, and from the fuel pump 86 to one or more fuel nozzles (not labeled; see FIG. 2) within the combustion section 26.

Further, still, the exemplary turbofan engine 10 depicted includes a thermal management system 90 and a lubrication oil system 92. As will be explained in greater detail below, the thermal management system 90 may generally be configured to transfer heat from a heat source of the turbofan engine 10 to a heat sink of the turbofan engine 10 utilizing a thermal transfer bus flowing a thermal transfer fluid therethrough. Further, the lubrication oil system 92 may be configured to provide lubrication oil to one or more bearings or sumps within the turbomachine 16 to facilitate rotation of one or more components, manage thermals of certain components (such as the bearings), etc.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as a turbojet engine, turboshaft engine, turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

Figure 2:
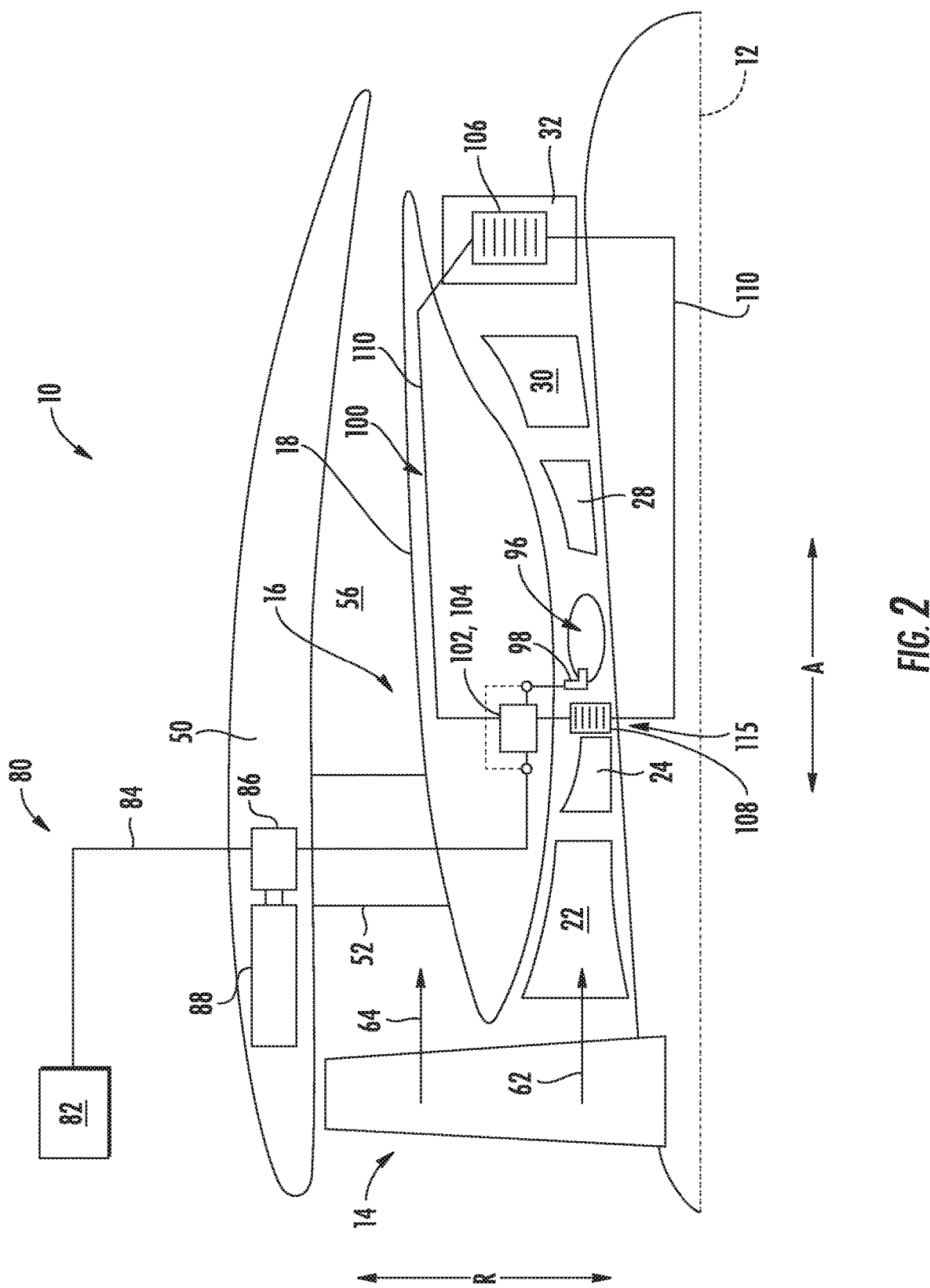
FIG. 2 is a simplified schematic view of a gas turbine engine having a first system and second system in accordance with an embodiment of the present disclosure.

Referring now to FIG. 2, a simplified, schematic view of a gas turbine engine 10 in accordance with an exemplary aspect of the present disclosure is provided. The exemplary gas turbine engine 10 depicted in FIG. 2 may be configured in substantially the same manner as exemplary turbofan engine 10 described above with reference to FIG. 1.

For example, as is shown, the gas turbine engine 10 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. The compressor section, the combustion section 26, the turbine section, and the exhaust section 32 generally define a core air flowpath 37 extending therethrough. An outer nacelle 50 surrounds at least in part the fan section 14 and a turbomachine 16, with the turbomachine 16 supported relative to the outer nacelle 50 through a plurality of outlet guide vanes 52 and the outer nacelle 50 defining a bypass airflow passage 56 with the turbomachine 16. A first portion 62 of an airflow from the fan section 14 is provided through the turbomachine 16 as a core airflow, and a second 64 portion of the airflow from the fan section 14 is provided through the bypass airflow passage 56 as a bypass airflow.

For the embodiment shown, an accessory gearbox 88 is positioned within the outer nacelle 50. However, as will be appreciated, in other embodiments, the accessory gearbox 88 may be positioned within an outer casing 18 of the turbomachine 16. The accessory gearbox 88 may be driven by one or both of a high pressure system of the turbomachine 16 or a low pressure system of the turbomachine, through one or more members extending through the guide vane(s) 52 (not shown).

The gas turbine engine 10 further includes a first system, the first system including a first system fluid line, with the first system fluid line including a first system fluid therein. Moreover, the first system further includes a first system fluid pump. For the embodiment shown, the first system is a fuel delivery system 80, the first system fluid line is a fuel line 84, and the first system fluid is fuel 94 (see FIG. 3). As with the fuel system 80 of FIG. 1, the exemplary fuel system 80 of the gas turbine engine 10 of FIG. 2 provides a flow of fuel 94 to the combustion section 26 of the gas turbine engine 10, and more specifically to a combustion chamber 96 of the combustion section 26 utilizing a fuel nozzle 98. For example, the fuel nozzle 98 may receive a flow of fuel from the plurality of fuel lines 84 and further may receive compressed air from the compressor section (e.g., the HP compressor 24). The fuel nozzle 98 may accordingly provide a mixture of compressed air and fuel to the combustion chamber 96, wherein such mixture of compressed air and fuel is combusted to generate combustion gasses. The fuel delivery system 80 generally also includes a fuel source 82, and for the embodiment depicted, the first system fluid pump is a fuel pump 88 in fluid communication with the one or more fuel lines 84. The fuel pump 88 is configured for increasing a pressure of a flow of fuel 94 from the fuel source 82 and through the one or more fuel lines 84.

In addition to the first system, the gas turbine engine 10 further includes a second system. As will be explained in more detail below, for the embodiment shown the second system is configured as a thermal management system of the gas turbine engine 10, and more specifically, as a waste heat recovery system 100. However, in other embodiments, the second system may be any other suitable thermal management system circulating a thermal fluid, or further any other system positioned within the turbomachine 16 requiring a flow of fluid.

Figure 3:
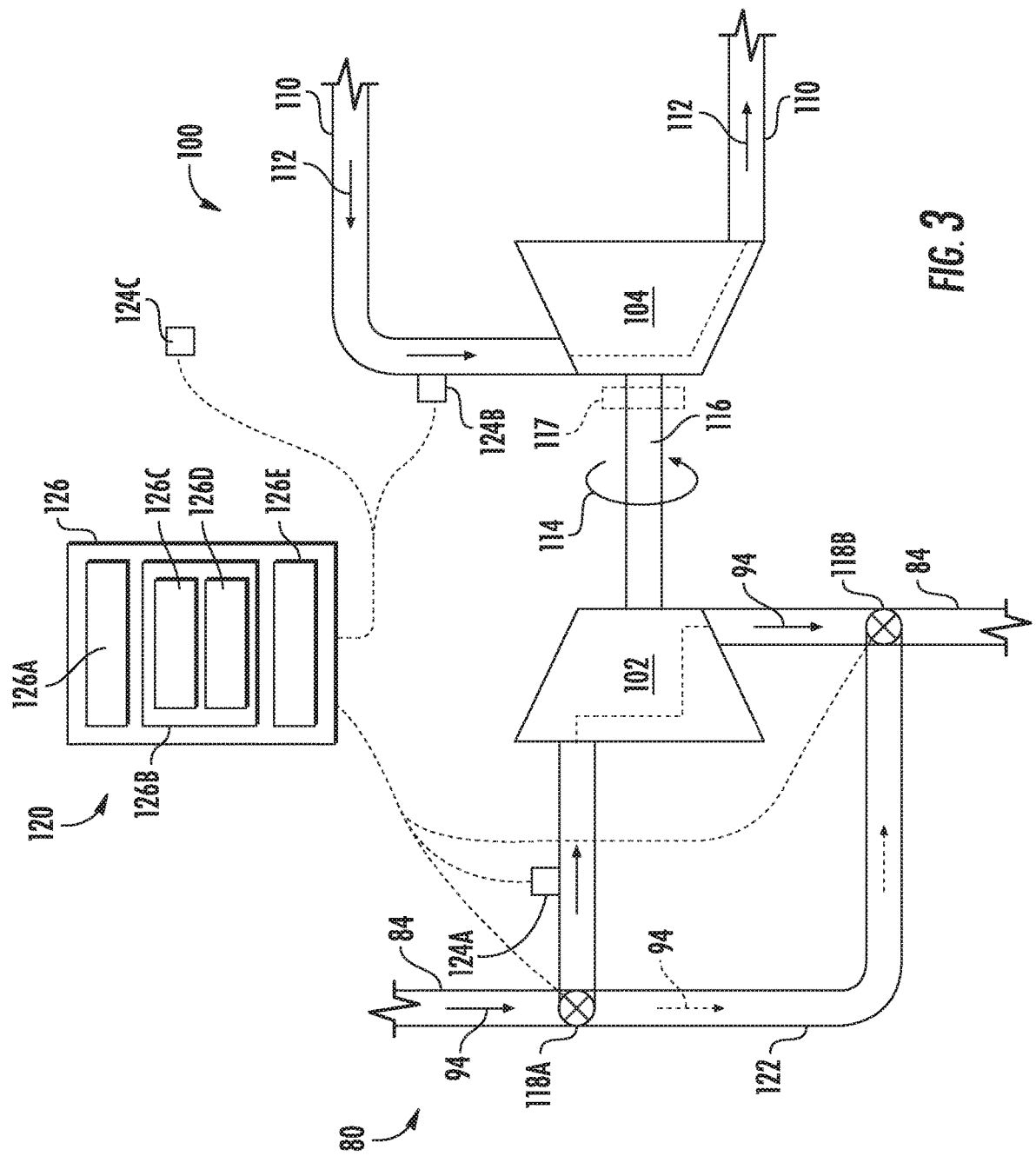
FIG. 3 is a simplified schematic view of the first system and second system of FIG. 2.

Referring still to FIG. 2, the second system, or rather the waste heat recovery system 100 for the embodiment depicted, includes a hydraulic motor 102 and a second system fluid pump 104 (shown in more detail in FIG. 3). The hydraulic motor 102 is positioned within the casing 18 of the turbomachine 16 and is fluidly coupled to the first fluid line of the first system, such that a flow of the first system fluid through the first system fluid line drives the hydraulic motor 102. Notably, for the embodiment shown, and as discussed above, the first system is the fuel delivery system 80, such that the hydraulic motor 102 of the second system, or rather of the waste heat recovery system 100, is fluidly coupled to the one or more fuel lines 84 such that a flow of fuel 94 through the one or more fuel lines 84 drives the hydraulic motor 102. Additionally, the second system/waste heat recovery system 100 further includes a second system fluid line. The second system fluid pump 104 is driven by the hydraulic motor 102 for providing a flow of a second system fluid through the second system fluid line during operation. Such a configuration will be described in greater detail below, with reference to FIG. 3.

As noted, the second system is configured as a thermal management system of the gas turbine engine 10, and more specifically, as a waste heat recovery system 100 for the embodiment of FIG. 2. The exemplary waste heat recovery system 100 is generally configured to extract heat from a heat source and transfer such extracted heat to a heat sink. For example, for the exemplary waste heat recovery system 100 depicted in FIG. 2, the waste heat recovery system 100 generally includes a heat source exchanger 106 (i.e., a heat exchanger configured to extract heat from a heat source of the engine 10) and a heat sink exchanger 108 (i.e., a heat exchanger configured to transfer heat to a heat sink of the engine 10). Additionally, the second system fluid line is configured as a thermal transfer bus 110, and the second system fluid pump 104 is configured to provide a flow of thermal transfer fluid 112 through the thermal transfer bus 110 (see FIG. 3).

For the embodiment shown, the heat source exchanger 106 is in thermal communication with a heat source, which may generally be the turbine section, the exhaust section 32, or both. Specifically, for the embodiment of FIG. 2, the heat source is the exhaust section 32 of the gas turbine engine 10, such that the heat source exchanger 106 is in thermal communication with the exhaust section 32 of the gas turbine engine 10. For example, the heat source exchanger 106 may be integrated into a strut extending through the exhaust section 32 or a liner defining at least in part the exhaust section 32, or alternatively may be positioned at any other suitable location in thermal communication with an airflow/gasses through the exhaust section 32 of the gas turbine engine 10.

Moreover, for the exemplary embodiment depicted, the heat sink exchanger 108 is in thermal communication with a heat sink, which may generally be the compressor section, the fuel delivery system 80, a bypass passage 56, or a combination of the foregoing. More specifically, for the embodiment depicted, the heat sink exchanger 108 is in thermal communication with the compressor section at a location proximate a downstream end of the compressor section, or more specifically still with a location proximate a downstream end of the HP compressor 24 of the compressor section.

Further, as stated, the waste heat recovery system 100 includes the thermal transfer bus 110. The thermal transfer bus 110 facilitates the flow thermal transfer fluid 112 therethrough and extends from/fluidly connects the heat source exchanger 106 to the heat sink exchanger 108. In such a manner, the thermal bus is configured to transfer the thermal transfer fluid 112 from the heat source exchanger 106 to the heat sink exchanger 108. The thermal transfer bus 110 may include one or more pipes, conduits, etc. arranged in series, parallel, or some combination thereof. Referring still to FIG. 2, it will be appreciated that the exemplary thermal transfer bus 110 is a closed loop thermal transfer bus 110 further extending from the heat sink exchanger 108 back to the heat source exchanger 106.

In one or more these embodiments, the thermal transfer fluid 112 may be a single phase thermal transfer fluid 112 during operation of the waste heat recovery system 100. Alternatively, the thermal transfer fluid 112 may be a phase change thermal transfer fluid 112 during operation of the waste heat recovery system 100. Additionally, or alternatively still, in one or more these configurations, the thermal transfer fluid 112 may be in a supercritical phase during one or more stages of operation, or during all operations.

It will be appreciated, however, that the exemplary gas turbine engine 10 and waste heat recovery system 100 depicted in FIG. 2 is provided by way of example only. In other embodiments, the waste heat recovery system 100 may have any other suitable configuration. Further, in other exemplary embodiments, the thermal management system may not be configured as a waste heat recovery system 100, and instead may be configured in any other suitable manner for managing heat within the gas turbine engine 10. For example, in other exemplary embodiments it will be appreciated that the heat source exchanger 106 may be thermally coupled to any other suitable heat source within the gas turbine engine 10, such as, e.g., an oil system of the gas turbine engine 10, the turbine section of the gas turbine engine 10, a cooled cooling air system of the gas turbine engine 10, etc. Further, in other exemplary embodiments, the heat sink exchanger may be operable with any other suitable heat sink of the gas turbine engine 10. For example, in other embodiments, the heat sink exchanger 108 may be thermally coupled to, e.g., the bypass passage 56 (such as couple to or integrated into, the strut 52), the fuel delivery system 80, etc.

Further, still, it will be appreciated that in other exemplary embodiments, the first system, the second system, or both may be any other suitable system of the gas turbine engine 10. For example, although for the embodiment shown, the first system is described as a fuel delivery system 80 of the gas turbine engine 10, in other exemplary embodiments, the first system may be a lubrication oil system of the gas turbine engine 10 (such as the lubrication oil system 92 of FIG. 1; configured to provide lubrication oil to various bearings and/or sumps of the gas turbine engine 10), a hydraulic fluid system of the gas turbine engine 10, etc. Similarly, although the second system is described as a thermal management system of the gas turbine engine 10, in other exemplary embodiments, the second system may instead be, e.g., a distributed oil system. With such a configuration, the second system may be configured as a locally positioned oil system configured to distribute/circulate lubrication oil to various bearings and/or sumps within the turbomachine 16. For example, the locally positioned oil system may be an oil system positioned at an aft end of the gas turbine engine 10 for servicing bearings and/or sumps of the turbine section of the gas turbine engine 10.

With these embodiments, it will be appreciated that the gas turbine engine 10 may save weight and conserve energy. For example, by driving the hydraulic motor 102 (which in turn drives the second system fluid pump 104) using a flow of first system fluid, the gas turbine engine 10 may not need to provide additional ducting of the second system fluid from, e.g., the nacelle 50 all the way to the aft end of the turbomachine 16.

Referring now to FIG. 3, a close-up, schematic view is provided of one exemplary aspect of the first system and second system of the gas turbine engine 10 of FIG. 2 (i.e., the fuel delivery system 80 and waste heat recovery system 100, respectively, for the embodiment depicted). As noted, the first system/fuel delivery system 80 for the embodiment shown includes the first system fluid line/fuel line 84. Additionally, the second system/waste heat recovery system 100 includes the hydraulic motor 102 and the second system fluid pump 104. The hydraulic motor 102 is positioned in fluid communication with the first system fluid line/fuel line 84 such that the flow of the first system fluid/fuel 94 through the first system fluid line drives the hydraulic motor 102, generating rotational power (as indicated by arrow 114). The hydraulic motor 102 is mechanically coupled to the second system fluid pump 104 through a shaft 116 for the embodiment shown, such that the hydraulic motor 102 may transfer such rotational power to the second system fluid pump 104, driving the second system fluid pump 104. The second system fluid pump 104 may in turn provide for the flow of the second system fluid/thermal transfer fluid 112 through the second system fluid line/thermal bus 110. It will be appreciated that, as is depicted in phantom, in certain embodiments, a speed change mechanism 117 may be positioned between the hydraulic motor 102 and fluid pump 104 to increase or decrease a relative rotational speed of the two components. The speed change mechanism may be any suitable speed change mechanism, such as a gearbox, a transmission, a clutch, etc.

Notably, it will further be appreciated that for the embodiment shown, the first system, the second system, or both include one or more valves 118 for bypassing operation of the hydraulic motor 102 of the second system, as well as a control system 120 operable with the one or more valves 118, as is described below. More specifically, for the embodiment shown, the one or more valves 118 includes a first valve 118A operable with the first system fluid line/fuel line 84 at a location upstream of the hydraulic motor 102 and a second valve 118B operable with the first system fluid line/fuel line 84 at a location downstream of the hydraulic motor 102. The gas turbine engine 10 further includes a bypass passage 122 fluidly connecting the first valve 118A and the second valve 118B. The first valve 118A, the second valve 118B, or both may be variable throughput valves 118 configured to vary the amount of fluid flow through the first system fluid line/fuel line 84 and bypass passage 122 between a ratio of 0:1 and 1:0, as well as one or more ratios therebetween (e.g., 1:10, 1:5, 1:4, 1:2, 1:1, 2:1, 4:1, 5:1, 10:1). Notably, although the valves 118 are depicted in the first system fluid line/fuel line 84, in other embodiments, the valves 118 may alternatively be positioned in the second system fluid line/thermal bus 110 for bypassing the second system fluid pump 104.

Moreover, as is depicted, the exemplary gas turbine engine 10 includes a plurality of sensors 124. For example, the plurality of sensors 124 includes a first sensor 124A operable with the first system, a second sensor 124B operable with the second system, and a third sensor 124C operable with one or more other exemplary aspects of the gas turbine engine 10, of an aircraft including the gas turbine engine 10, or both. For example, the first sensor 124A may be configured to sense data indicative of a fluid flow through the first system fluid line, a temperature of the fluid flow through the first system fluid line, a pressure of the fluid flow through the first system fluid line, or a combination thereof. Similarly, the second sensor 124B may be configured to sense data indicative of a fluid flow through the second system fluid line, a temperature of the fluid flow through the second system fluid line, a pressure of the fluid flow through the second system fluid line, or a combination thereof. Moreover, the third sensor 124C may be configured to sense data indicative of a rotational speed parameter of the gas turbine engine 10 (e.g., a rotational speed of a high-speed spool, of a low-speed spool, of a fan, etc.), a temperature parameter of the gas turbine engine 10 (e.g., a compressor exit temperature, a compressor inlet temperature, a turbine inlet temperature, a turbine exit temperature, etc.), a power demand for the gas turbine engine 10 or an aircraft including the gas turbine engine 10, etc.

Further, as noted, the gas turbine engine 10 includes the control system 120. The control system 120 generally includes a controller 126. The exemplary controller 126 depicted is configured to receive the data sensed from the one or more sensors 124 (sensors 124A, 124B, 124C for the embodiment shown) and, e.g., may make control decisions for the gas turbine engine 10.

In one or more exemplary embodiments, the controller 126 depicted may be a stand-alone controller for the gas turbine engine 10, or alternatively, may be integrated into one or more of a controller for the aircraft with which the gas turbine engine 10 is integrated, etc.

Referring particularly to the operation of the controller 126, in at least certain embodiments, the controller 126 may generally be configured as one or more computing device(s) 126. The computing device(s) can include one or more processor(s) 126A and one or more memory device(s) 126B. The one or more processor(s) 126A can include any suitable processing device, such as a microprocessor, microcontroller, integrated circuit, logic device, and/or other suitable processing device. The one or more memory device(s) 126B can include one or more computer-readable media, including, but not limited to, non-transitory computer-readable media, RAM, ROM, hard drives, flash drives, and/or other memory devices.

The one or more memory device(s) 126B can store information accessible by the one or more processor(s) 126A, including computer-readable instructions 126C that can be executed by the one or more processor(s) 126A. The instructions 126C can be any set of instructions that when executed by the one or more processor(s) 126A, cause the one or more processor(s) 126A to perform operations. In some embodiments, the instructions 126C can be executed by the one or more processor(s) 126A to cause the one or more processor(s) 126A to perform operations, such as any of the operations and functions for which the controller 126 and/or the computing device(s) are configured, the operations for operating a thermal management system 100 (e.g, method 200), as described herein, and/or any other operations or functions of the one or more computing device(s) 126. The instructions 126C can be software written in any suitable programming language or can be implemented in hardware. Additionally, and/or alternatively, the instructions 126C can be executed in logically and/or virtually separate threads on processor(s) 126A. The memory device(s) 126B can further store data 126D that can be accessed by the processor(s) 126A. For example, the data 126D can include data indicative of power flows, data indicative of engine/aircraft operating conditions, and/or any other data and/or information described herein.

The computing device(s) can also include a network interface 126E used to communicate, for example, with the other components of the thermal management system 100, the gas turbine engine 10 incorporating thermal management system 100, the aircraft incorporating the gas turbine engine 10, etc. For example, in the embodiment depicted, as noted above, the gas turbine engine 10 and/or thermal management system 100 includes one or more sensors 124 for sensing data indicative of one or more parameters of the gas turbine engine 10, the fuel delivery system 80, the thermal management system 100, or a combination thereof. The controller 126 is operably coupled to the one or more sensors 124 through, e.g., the network interface 124E, such that the controller 126 may receive data indicative of various operating parameters sensed by the one or more sensors 124 during operation. Further, for the embodiment shown the controller 126 is operably coupled to, e.g., the first valve 118A and the second valve 118B for providing control instructions thereto. In such a manner, the controller 126 may be configured to selectively actuate the first and/or second valve 118A, 118B in response to, e.g., the data sensed by the one or more sensors 124.

The network interface 126E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In sum, it will be appreciated that the controller 126 is operably coupled to the one or more valves 118 for controlling operation of the one or more valves 118 in response to an operating condition of the gas turbine engine 10, an aircraft including the gas turbine engine 10, or both. Such operations will be described in greater detail below with reference to the exemplary method of FIG. 4.

Referring now to FIG. 4, a flow diagram of a method 200 for operating a gas turbine engine is provided. The method 200 may be utilized with one or more of the exemplary gas turbine engines described above with reference to FIGS. 1 through 3.

The method 200 includes at (202) providing a first system fluid flow through a first system fluid line of a first system of the gas turbine engine. For the exemplary aspect depicted, providing the first system fluid flow through the first system fluid line at (202) includes at (204) pressurizing the first system fluid flow with a first system fluid pump, and further includes at (206) driving the first system fluid pump with an accessory gearbox of the gas turbine engine.

The method 200 further includes at (208) driving a hydraulic motor of a second system of the gas turbine engine with the first system fluid flow through the first system fluid line. The hydraulic motor is positioned within a casing of the gas turbine engine surrounding a compressor section, a combustion section, and a turbine section of the gas turbine engine.

Referring still to FIG. 4, the method 200 additionally includes at (210) providing a second system fluid flow through a second system fluid line of the second system of the gas turbine engine with the hydraulic motor. More specifically, providing the second system fluid flow through the second system fluid line at (210) includes at (212) driving a second system fluid pump with the hydraulic motor, and at (214) pressurizing the second system fluid flow with the second system fluid pump. Notably, in certain exemplary aspects, driving the second system fluid pump with the hydraulic motor at (212) may include directly driving the second system fluid pump with the hydraulic motor, or alternatively may include driving the second system fluid pump with the hydraulic motor across a speed change mechanism, such as a gearbox, a transmission, a clutch, etc.

Further, the method 200 includes at (216) determining an operating condition of the gas turbine engine, an aircraft including the gas turbine engine, or both. For example, determining the operating condition at (216) may include receiving data sensed from one or more sensors indicative of a temperature, a pressure, a flow rate, or a combination thereof of a fluid flow through the first system fluid line, through the second system fluid line, or both. Additionally, or alternatively, determining the operating condition at (216) may include receiving data sensed from one or more sensors indicative of a rotational speed parameter of the gas turbine engine, a temperature and/or pressure parameter the gas turbine engine, an operating parameter of the aircraft including the gas turbine engine, etc.

Further, the method 200 includes at (218) reducing the driving of the hydraulic motor of the second system of the gas turbine engine with the first system fluid flow through the first system fluid line in response to determining the operating condition of the gas turbine engine, the aircraft including the gas turbine engine, or both at (216). For example, for the embodiment depicted, reducing the driving of the hydraulic motor of the second system of the gas turbine engine at (218) includes at (220) diverting at least a portion of the first system fluid flow through the first system fluid line around the hydraulic motor. For example, diverting at least a portion of the first system fluid flow through the first system fluid line around the hydraulic motor at (220) may include diverting a portion of the first system fluid flow around the hydraulic motor, or all of the first system fluid flow around the hydraulic motor.

More specifically, for the exemplary aspect depicted, the first system is a fuel delivery system of the gas turbine engine and determining the operating condition of the gas turbine engine, the aircraft including the gas turbine engine, or both at (216) includes at (222) determining an operating condition indicative of a fuel flow the combustion section gas turbine engine. For example, during high-power operation modes, such as takeoff and climb operating modes, a relatively high amount of fuel flow may be necessary, such that extracting power from the fuel flow with the hydraulic motor to drive the second system may not be advantageous. By contrast, during relatively low power operation modes, such as idle, descent, or cruise, less fuel flow may be necessary, such that there is less of a disadvantage (or an advantage) to extracting power from the fuel flow to drive the second system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and comprising:
    a compressor section, a combustion section, and a turbine section arranged in serial flow order;
    a casing surrounding the compressor section, the combustion section, and the turbine section;
    a first system comprising a first system fluid line, the first system fluid line comprising a first system fluid therein;
    a second system comprising a hydraulic motor, the hydraulic motor positioned within the casing and fluidly coupled to the first system fluid line such that a flow of the first system fluid through the first system fluid line drives the hydraulic motor, the second system further comprising a fluid pump and a second system fluid line, the hydraulic motor drivingly coupled to the fluid pump, the fluid pump operable with the second system fluid line for providing a flow of a second system fluid through the second system fluid line during operation; and
    a controller configured to determine a condition indicative of a fuel flow to the combustion section of the gas turbine engine and drive the hydraulic motor of the second system of the gas turbine engine in response to the determined condition;
    wherein the fluid pump is a second system fluid pump, wherein the first system further comprises a first system fluid pump fluidly coupled to the first system fluid line for providing the flow of the first system fluid through the first system fluid line.

2. The gas turbine engine of claim 1, further comprising:
    an accessory gearbox, wherein the first system fluid pump is driven by the accessory gearbox.

3. The gas turbine engine of claim 2, further comprising:
    a fan; and
    an outer nacelle surrounding at least in part the fan, the casing, or both, and wherein the first system fluid pump and accessory gearbox are positioned within the outer nacelle.

4. The gas turbine engine of claim 1, wherein the first system is a fuel delivery system of the gas turbine engine.

5. The gas turbine engine of claim 1, wherein the first system is a lubrication oil system of the gas turbine engine.

6. The gas turbine engine of claim 1, wherein the second system is a thermal management system of the gas turbine engine.

7. The gas turbine engine of claim 6, wherein the thermal management system comprises a heat source heat exchanger and a heat sink heat exchanger, wherein the heat source heat exchanger is fluidly coupled to the heat sink heat exchanger through the second system fluid line.

8. The gas turbine engine of claim 7, wherein the heat source heat exchanger is thermally coupled to the combustion section, the turbine section, or an exhaust section of the gas turbine engine, and wherein the heat sink heat exchanger is thermally coupled to the compressor section of the gas turbine engine, a fuel delivery system of the gas turbine engine, or a bypass airflow passage of the gas turbine engine.

9. The gas turbine engine of claim 1, wherein the first system, the second system, or both comprise one or more valves for bypassing operation of the hydraulic motor of the second system based on one or more operating conditions of the gas turbine engine.

10. The gas turbine engine of claim 9, wherein the controller is operably coupled to the one or more valves for controlling operation of the one or more values in response to an operating condition of the gas turbine engine, an aircraft including the gas turbine engine, or both.

11. The gas turbine engine of claim 10, further comprising:
    one or more sensors operable with the gas turbine engine, the aircraft including the gas turbine engine, or both for sensing data indicative of the operating condition of the gas turbine engine, an aircraft including the gas turbine engine, or both, wherein the controller is operably coupled to the one or more sensors.

12. A method for operating a gas turbine engine comprising:
    providing a first system fluid flow through a first system fluid line of a first system of the gas turbine engine;
    driving a hydraulic motor of a second system of the gas turbine engine with the first system fluid flow through the first system fluid line, the hydraulic motor positioned within a casing surrounding a compressor section, a combustion section, and a turbine section of the gas turbine engine;
    providing a second system fluid flow through a second system fluid line of the second system of the gas turbine engine with the hydraulic motor by driving a second system fluid pump with the hydraulic motor, and pressurizing the second system fluid flow with the second system fluid pump; and determining a condition indicative of a fuel flow to a combustion section of the gas turbine engine;

wherein the driving of the hydraulic motor of the second system of the gas turbine engine comprises driving the hydraulic motor in response to the determined condition; and wherein the first system further comprises a first system fluid pump fluidly coupled to the first system fluid line for providing the first system fluid flow through the first system fluid line.

13. The method of claim 12, further comprising:

determining an operating condition of both the gas turbine engine and an aircraft including the gas turbine engine; and reducing the driving of the hydraulic motor of the second system of the gas turbine engine with the first system fluid flow through the first system fluid line in response to determining the operating condition of the gas turbine engine and the aircraft including the gas turbine engine.

14. The method of claim 12, wherein reducing the driving of the hydraulic motor of the second system of the gas turbine engine comprises diverting at least a portion of the first system fluid flow through the first system fluid line around the hydraulic motor.

15. The method of claim 14, wherein diverting at least a portion of the first system fluid flow through the first system fluid line around the hydraulic motor comprises actuating one or more valves fluidly coupled to the first system fluid line, the second system fluid line, or both.

16. The method of claim 13, wherein the first system is a fuel delivery system of the gas turbine engine, and wherein the condition is an operating condition of the gas turbine engine.

17. The method of claim 12, wherein providing a first system fluid flow through a first system fluid line of a first system of the gas turbine engine comprises driving the first system fluid pump with an accessory gearbox.

18. The method of claim 17, wherein the accessory gearbox and first system fluid pump are positioned in an outer nacelle of the gas turbine engine.

19. A gas turbine engine defining a radial direction and comprising:

a compressor section, a combustion section, and a turbine section arranged in serial flow order;

a casing surrounding the compressor section, the combustion section, and the turbine section;

a first system comprising a first system fluid line, the first system fluid line comprising a first system fluid therein;

a second system comprising a hydraulic motor, the hydraulic motor positioned within the casing and fluidly coupled to the first system fluid line such that a flow of the first system fluid through the first system fluid line drives the hydraulic motor, the second system further comprising a fluid pump and a second system fluid line, the hydraulic motor drivingly coupled to the fluid pump, the fluid pump operable with the second system fluid line for providing a flow of a second system fluid through the second system fluid line during operation; and a controller configured to determine a condition indicative of a fuel flow to the combustion section of the gas turbine engine and drive the hydraulic motor of the second system of the gas turbine engine in response to the determined condition;

wherein the first system is a fuel delivery system of the gas turbine engine.

20. The gas turbine engine of claim 19, wherein the fluid pump is a second system fluid pump, wherein the first system further comprises a first system fluid pump fluidly coupled to the first system fluid line for providing the flow of the first system fluid through the first system fluid line, the gas turbine engine further comprising an accessory gearbox, wherein the first system fluid pump is driven by the accessory gearbox.

* * * * *